Aug. 11, 1953  J. R. CLIFTON  2,648,313
SERVO VALVE BYPASS
Filed June 9, 1952  3 Sheets-Sheet 1
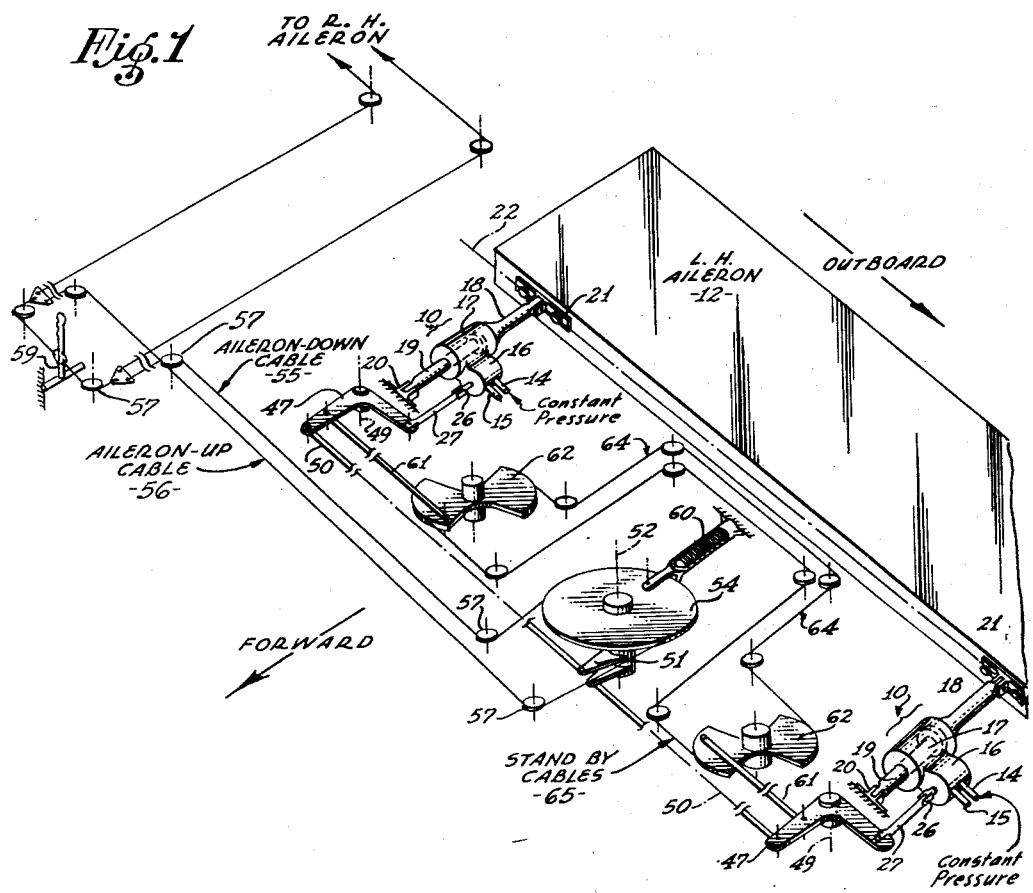
INVENTOR:
John R. Clifton
By Herbert E. Metcalf
HIS PATENT ATTORNEY Aug. 11, 1953 J. R. CLIFTON 2,648,313
SERVO VALVE BYPASS
Filed June 9, 1952 3 Sheets-Sheet 2
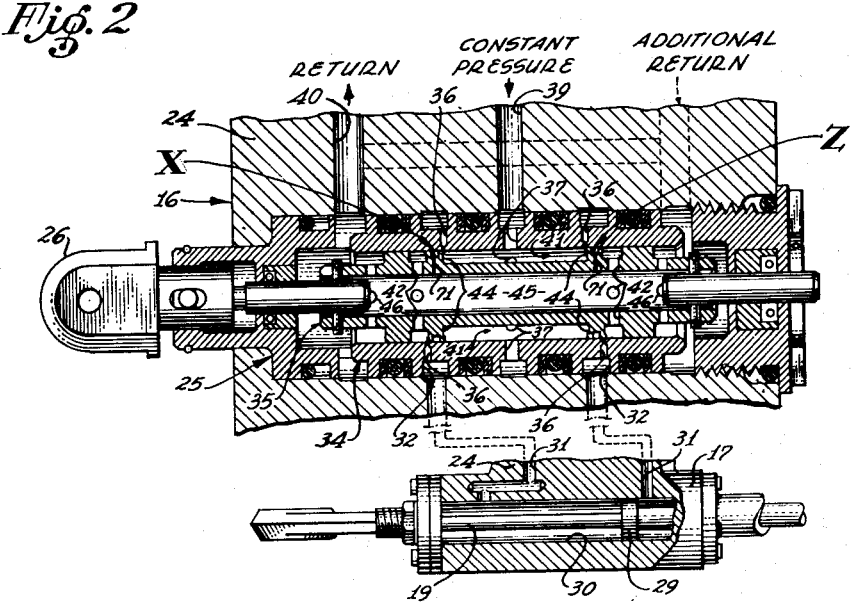
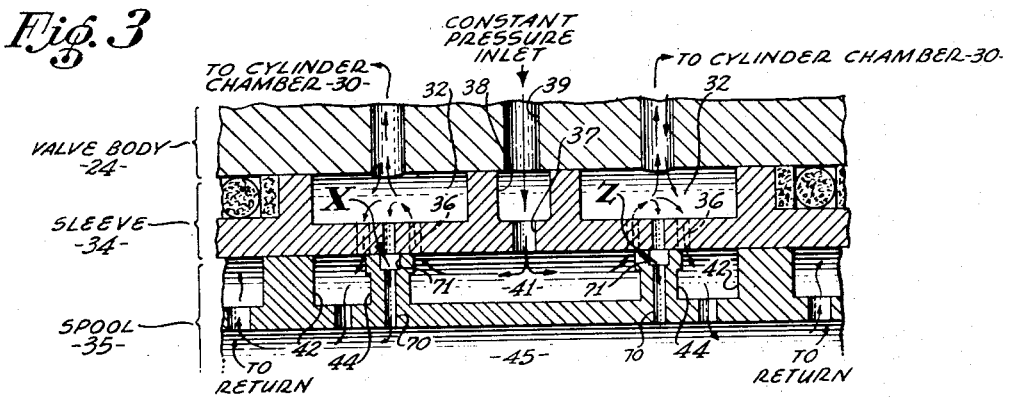
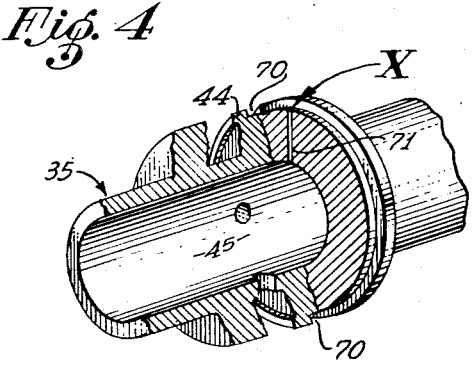
INVENTOR:
John R. Clifton
BY Herbert E. Metcalf
HIS PATENT ATTORNEY Aug. 11, 1953  J. R. CLIFTON  2,648,313
SERVO VALVE BYPASS
Filed June 9, 1952  3 Sheets-Sheet 3

Patented Aug. 11, 1953

2,648,313

UNITED STATES PATENT OFFICE 2,648,313

SERVO VALVE BYPASS

John R. Clifton, Rolling Hills, Calif., assignor to Northrop Aircraft, Inc., Hawthorne, Calif., a corporation of California Application June 9, 1952, Serial No. 292,411

4 Claims. (Cl. 121—46.5)

My invention relates to means for controlling rate gain in hydraulic power systems, and more particularly to an improved means for by-passing hydraulic fluid in a hydraulic control valve to control the rate gain in a hydraulic system.

In the copending application of Feeney, Serial No. 23,567, filed April 27, 1948, now abandoned, there is shown a complete high pressure hydraulic control system for operating attitude control surface in an aircraft solely by hydraulic power under control of the pilot. In this system each hydraulic power unit, which normally includes a piston driven within a cylinder by hydraulic fluid from a constant pressure source to operate an attitude control surface, is actuated by a neutral leakage type control valve which is usually integrally mounted on the hydraulic motor cylinder. The control valve is properly designed to provide, at the neutral position thereof, a predetermined fluid flow of relatively small magnitude from the pressure supply port to both of the hydraulic motor operating ports while simultaneously allowing an equal flow from the operating ports to a system return port. In a 2000 p. s. i. system, for example, the neutral leakage passages of the valve described above are designed to create a 1000 p. s. i. preload in each operating port and, therefore, on each side of the piston of the altitude control surface actuating motor to provide a required surface control rigidity at all times during operation of the system. The valve just described is shown, described, and claimed by Strayer in the copending application Serial No. 123,375, filed October 25, 1949, now Patent No. 2,612,872.

The rate of fluid flow from a constant pressure source into and out of a hydraulic motor cylinder in a hydraulic system is generally expressed by the term "piston velocity," and the term "gain" as used herein is defined as meaning the ratio of valve displacement, i. e. travel distance of the valve away from neutral, to the rate of flow (piston velocity) to the hydraulic motor cylinder.

In order to assure maximum stability in the control systems of high speed airplanes from the standpoint of the pilots control element as well as the surface moving system, we have found that in the ideal system, gain should be very low near the neutral position of the valve, and in the full open position range of the valve, the gain should be relatively high, as was described in the copending application of Strayer and myself, Serial No. 228,716, filed May 28, 1951, of which application my present invention is a continuation-in-part.

If, in the type of hydraulic control system under discussion, the means for reducing gain in the system is made to be effective near the neutral position only of the control valve, it is possible to have full system pressure available near the full open position of the valve, a feature which is highly desirable. Therefore, it is one of the objects of my present invention to provide an improved means for controlling gain in a hydraulic full power control system.

It is another object of my invention to provide a means of controlling gain in a high pressure hydraulic airplane control system, which is effective only near the neutral position of a control valve, so that full system pressure is always available in the full open position range of the valve.

Other objects and features will be apparent as the specification continues.

Briefly, the by-pass means of my present invention, in one embodiment thereof, takes the form of a by-pass means integrally associated with the metering lands of a valve spool in a neutral leakage type control valve, and movable with the valve spool over the metering holes of a fixed valve sleeve in the valve, so that as the metering lands traverse the metering holes of the sleeve during travel of the spool away from the neutral position thereof, the by-pass means comes into alignment with the metering holes of the sleeve to by-pass a controlled amount of the fluid flowing through the valve to the motor cylinder, into the return passage of the valve; the fluid thus by-passed being controlled to an amount to give the proper gain reduction to produce the maximum stability in the system. The by-pass means is so positioned in the spool lands as to operate only during the initial travel of the spool from neutral, being inoperable when the full open position range of the valve is approached.

To facilitate a fuller understanding of my present invention the accompanying drawings are provided wherein:

Figure 1 is a schematic diagram in perspective of a portion of a full power airplane hydraulic control system; the portion of a control surface shown being an aileron for example.

Figure 2 is a fragmentary longitudinal sectional view of the neutral leakage control valve and motor; the size of the motor in proportion to the valve being greatly reduced.

Figure 3 is a framentary enlarged schematic view in longitudinal section of a portion of the valve of Figure 1, to more clearly show the by-pass means of the present invention as identified by X and Z.

Figure 4 is a fragmentary view in perspective of the valve spool of the previous figures, showing one preferred construction of the by-pass means.

Figure 5:
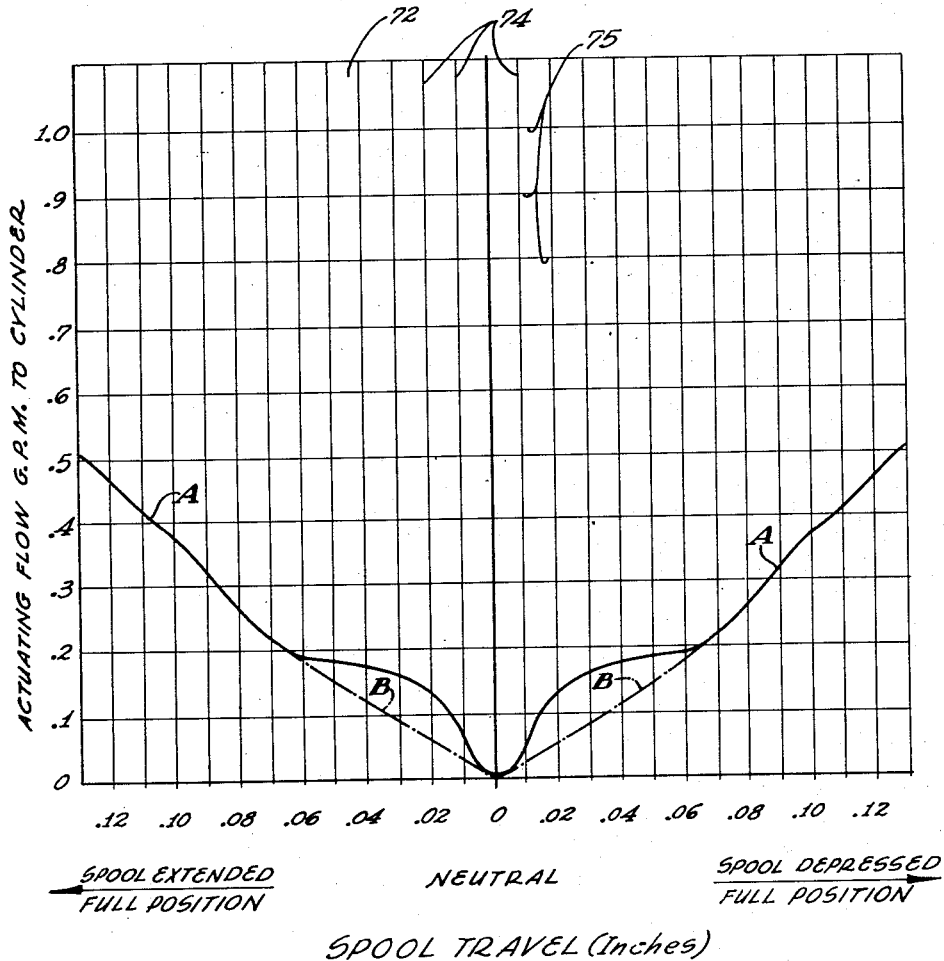
Figure 5 is a coordinate diagram charting the comparative flow curves of the valve of the previous figures with and without by-pass means.

A portion of one form of a full power control system which is highly suitable for airplanes in the 600+ M. P. H. class is shown in Figure 1, where a pair of aileron power units 10 are operatively connected to move an aileron 12 which is normally located in the wing panel of an aircraft (not shown). A hydraulic pressure line 14 and return line 15 connect into servo control valves 16 connected to each outboard power unit 10.

The aileron power units 10 and servo valves 16 of each unit are identical and therefore only one unit will be described in detail. Each power unit 10 is composed of an actuating cylinder 17 having its piston rod 19 projecting forwardly and pivotally secured to structural fittings 20 attached in the wing panel (not shown). The closed end 18 of the cylinder 17 connects directly to an aileron pivot fitting 21 above an aileron hinge line 22.

A valve housing 24 is connected with the actuating cylinder 17, or is made an integral part thereof as in the present case, and encloses an inner valve assembly 25 as is best shown in Figure 2. The clevis 26 end of the valve assembly 25 extends out one end of valve housing 24 to connect to a valve operating rod 27 as shown in Figure 1.

Referring again to Figure 2, in the actuating cylinder 17 the piston rod 19 carries a piston 29 operating in a cylinder chamber 30 having cylinder operating supply passages 31 at each end thereof. Supply passages 31 lead to outer fluid grooves 32 in the valve assembly 25 which comprises a fixed sleeve 34 and a hollow valve spool 35 slidably mounted therein. Each outer fluid groove 32 connects with the interior of the sleeve 34 by means of extremely small radially drilled fluid flow metering holes 36 which are each located in a staggered pattern relative to each other, lengthwise of the sleeve 34. A ring of relative large pressure ports 37 are provided through the approximate center of the sleeve 34 and are radially and circumferentially arranged therearound to communicate with a pressure inlet bore 39 in the valve housing 24, which also connects to one of the pressure fluid lines (not shown). Opposite one end of the sleeve 34, a return bore 40 also communicates with the interior of sleeve 34 and with a return line (not shown).

The valve spool 35 has a peripheral pressure groove 41 therearound and positioned opposite the sleeve pressure ports 37, and return grooves 42 on each side of the pressure groove 41.

On the spool 35 metering lands 44 separate the spool grooves 42 and 41 and are located opposite the respective sets of sleeve fluid flow metering holes 36 when the spool 35 is in neutral position. The spool return grooves 42 connect with an axial spool bore 45 which communicates with a number of radial spool end passages 46 by which return fluid reaches the housing return bore 40.

The two outer edges of each metering land 44 are completely square cornered and hardened to such a degree as to be capable of shearing any foreign particles which might be carried into the valve in the hydraulic fluid. The spacing of the center line of each land 44 is equally spaced with the center line of the metering hole patterns so that the pressure inlet 39 always communicates with one side of each metering land, and the fluid outlet 42 always communicates with the other side of each metering land 44. Thus movement in either direction of the spool 35 away from neutral position causes fluid flow openings 36 to be serially uncovered to connect one side of the actuating cylinder piston 29 to pressure through one of the cylinder supply passages 31, and to connect the other side of the piston 29 to return.

The metering lands 44 with respect to openings 36, are properly spaced and constructed so as to allow a predetermined balanced leakage to pass through the openings 36 to both sides of actuating cylinder piston 29 and the same balanced leakage from both sides of the piston 29 to the return bore 40, when the valve spool 34 is in neutral position.

It should be mentioned that the valve is not, per se a claimable part of the present invention as it forms the subject of the above mentioned Patent 2,612,872 to Strayer, but is described in detail so that the function of my by-pass will be more easily understood.

Referring again to Figure 1, each valve operating rod 27 is pivotally connected to a bell crank 47 which is rotatable about a fixed axis 49 and a solid linkage 50 connects each bell crank 47 to a common bell crank arm 51 rotatable about a quadrant axis 52. A cable control quadrant 54, fixed to rotate with the crank arm 51, carries an aileron down cable 55 on one side thereof and an aileron up cable 56 affixed on the opposite sides thereof; these cables passing over pulleys 57 and running to a pilot's control stick 59 in the conventional manner. A centering spring assembly 60 connected from a point on the control quadrant 54 to the wing structure (not shown) provides the required control stick centering forces.

Also pivotally connected to each bell crank 47 and moving in the same direction, is a push-pull rod 61 similarly connected to one of two synchronizing quadrants 62 which are commonly connected to rotate together by closed circuit synchronizing cables 64, so that when the aileron control cables 55 and 56 move the linkages 50 and the respective bell cranks 47, the standby cables 65 are likewise moved therewith.

It can be seen from the above description of the full power control system, that relatively small movements of the control stick will move the control surface. Not shown, of course, are other mechanisms for changing the ratio of stick movement to surface movement, artificial feel producer, backlash removers etc. which are necessary in such control systems in high speed aircraft. It will be immediately apparent, however, in such a control system, stability is particularly critical. To that end then, the by-pass means of my present invention is directed.

To reduce gain in the system near the neutral position of the valve, I provide a by-pass means, one form of which is shown in Figures 2, 3, and 4 at X and Z. Each land 44 of valve spool 35 of Figure 2, as best shown in Figures 3 and 4, is provided with a groove 70 which preferably extends completely around the circumference of the outer periphery thereof and is spaced approximately equidistant between each shearing edge thereof. A single bore 71 is drilled in the bottom of the groove 70 at any point around the circumference of the land 44; the bore 71 being sized to about .013 inch in diameter in the present example, and extending from the bottom of groove 70 to the interior of spool 35. The width of the groove 70 is made slightly wider than the diameter of bore 71. It should be noted in Figure 3, that for the sake of clarity, the cylinder supply passages 31 are shown at the top of valve block 24 while the pressure inlet 39 is shown in normal relation to the valve. In this view fluid is supplied through the pressure inlet 39 and enters a pressure groove 38 of the sleeve 34, and is then admitted through pressure ports 37 in groove 38 to the pressure groove 41 between the lands 44 on spool 35. It can now be seen that when spool 35 is in neutral, as shown, the flow hole 36 (schematically shown in dotted lines) at each end of the pattern of flow holes is bisected to permit a small flow therethrough and across the openings of the cylinder chamber pressure passage 31; a like amount of flow being returned through return grooves 42 on the outer sides of lands 44. Thus a balanced pressure is continuously maintained on each side of the piston 29 in the cylinder 17 during neutral.

As the spool 35 is moved away from neutral, the lands 44 traverse the flow holes 36, serially opening the flow holes on one end of sleeve 34 to increase the flow to one pressure passage 31, at the same time serially uncovering the flow holes 36 on the other end of sleeve 34 to admit return flow from the cylinder 17 through pressure passage 31 of the corresponding end thereof. Inasmuch as the ratio of spool 35 movement over the flow holes 36 is directly related to flow rate, and flow rate to piston velocity and gain as was explained early in this specification, it is apparent that the by-pass bore 71 in the groove 70 on the particular land 44 on the pressure side, by-passes a portion of the flow from the pressure inlet 39 directly into the inner chamber 45 of the spool 35 and thence to return; reducing the rate of gain in the system. It should further be noted that by the time the inner edge of the land 44 on the pressure side of the valve spool 35 has approximately cleared the center flow hole 36, the by-pass bore 71 will have cleared the outer end flow hole and is, for the balance of the spool travel toward full open position, inoperative. It is therefore obvious that full system pressure is resumed for the full open position range of the valve.

In addition to providing the required gain reduction in the system, the by-pass described above has been found to have a desirable damping effect in the valve, especially during operation of the system when there is an absence of load on the control surface, such as when the airplane is on the ground, for example; a highly desirable feature in a high pressure hydraulic system of any kind.

The simple construction of the by-pass bore 71 from a manufacturing standpoint is more clearly shown in Figure 4.

The flow curve evolved by incorporation of the by-pass bore 71 in the valve of the previous figures is shown in Figure 5 in a coordinate chart plotting the curves which reflect the gain in 72 the hydraulic system as the valve is moved from neutral in either direction. The vertical ordinates 74 represent spool travel in decimal fractions of one inch, and the horizontal ordinates 75 represent decimal fractions of one gallon per minute of flow as the valve is opened to either side of the actuating motor.

Curve A of the chart reflects the performance of the valve of Figure 2 without any by-pass means. It can here be seen that as the valve spool is displaced from neutral, a relatively steep curve results indicating a sharp increase in gain as the spool moves through the first .02 inch of travel over the flow hole pattern of the valve sleeve. The balance of the curve A of course indicates subsequent increases as the spool moves to full open position. The sharp increase in rate gain thus shown, can indicate instability in the system.

With the by-pass means of the present invention incorporated into the valve, the flow characteristics thereof evolves curve B which shows a definite reduction in the slope of the curve from neutral to about .06 inch of spool travel; the desired result sought. From .06 inch toward full position curve B blends into curve A as the by-pass moves out of range of the flow hole pattern and into the range of full open position of the valve to indicate that full system pressure is then available in the system.

It has thus been shown that the by-pass means of my present invention satisfactorily fulfills the functions desired in a high pressure hydraulic system, as shown by curve B which substantially illustrates the ideal curve sought in such a system, while being relatively simple to incorporate into a valve of the type described and shown herein. Further, manufacturing costs and time in connection with such means are relatively negligible.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. In a hydraulic control system of the character described including a neutral leakage valve, a hollow sleeve fixed in said valve and having a fluid pressure inlet therethrough, said fluid pressure inlet comprising a plurality of relatively large, radially and circumferentionally aligned holes through the wall of said sleeve, a fluid outlet from the interior of said sleeve around an end thereof, two operating cylinder passages through said sleeve on opposite sides of said pressure inlet, each of said cylinder passages consisting of a plurality of extremely small metering holes positioned radially through said sleeve around the periphery thereof and all staggered relative to each other lengthwise of said sleeve, a hollow spool member matching the interior of said sleeve and movable in either direction from a neutral position, the interior of said spool communicating with the return outlet of said valve, two metering lands on said spool and contacting the interior of said sleeve and having the two outer edges thereof completely square cornered, the spacing of the center lines of said lands equaling the spacing of the center lines of the cylinder passages, said pressure inlet always communicating with one side of each metering land, and said fluid outlet always communicating with the other side of each metering land; means for reducing rate gain in said system, comprising means associated with each of said metering lands and movable therewith over said metering holes to by-pass a portion of fluid from said pressure inlet directly into said fluid outlet.

2. Apparatus in accordance with claim 1 wherein said means for reducing the gain in said hydraulic control system defines at least one by-pass channel extending through each metering land of said spool, between the interior of said sleeve and the interior of said spool, whereby when said by-pass channel is aligned with one of said metering holes of said sleeve, a portion of said fluid from said pressure inlet is by-passed into the interior of said spool.

3. Apparatus in accordance with claim 1 wherein said means for reducing gain in said hydraulic system comprises a groove on the outer periphery of each of said metering lands and extending completely around the circumference thereof, and means defining a bore, one end of said bore opening in the bottom of said groove, the other end of said bore opening in the interior of said spool, whereby when said groove is aligned with one of said metering holes of said sleeve, a portion of said fluid from said pressure inlet is by-passed through said bore to the interior of said spool.

4. Apparatus in accordance with claim 1 wherein said means for reducing gain in said hydraulic system comprises, a groove on each land and positioned equidistant from each edge thereof and extending completely around the circumference thereof, and means defining a by-pass channel through each land, the opening at one end of said channel opening in said groove and the opening at the other end of said channel being positioned in the interior of said spool, whereby when said groove is aligned with at least one of the metering holes of said sleeve, a portion of said fluid from said pressure inlet is by-passed through said channel to the interior of said spool.

JOHN R. CLIFTON.

No references cited.